(12) United States Patent
Su et al.

(10) Patent No.: US 8,144,401 B2
(45) Date of Patent: Mar. 27, 2012

(54) ZOOM LENS

(75) Inventors: Yuan-Hung Su, Hsinchu (TW); Yi-Hao Kang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 288 days.

(21) Appl. No.: 12/703,511

(22) Filed: Feb. 10, 2010

(65) Prior Publication Data

US 2011/0194188 A1 Aug. 11, 2011

(51) Int. Cl.
G02B 15/14 (2006.01)
G02B 9/00 (2006.01)

(52) U.S. Cl. ......................... 359/686; 359/649
(58) Field of Classification Search ............. 359/686, 359/680–682
See application file for complete search history.

(56) References Cited

U.S. PATENT DOCUMENTS

| | | | |
|---|---|---|---|
| 6,137,638 A | 10/2000 | Yamagishi et al. | |
| 6,606,201 B1 * | 8/2003 | Hirose | 359/686 |
| 6,738,196 B2 | 5/2004 | Yamamoto | |
| 6,894,845 B2 | 5/2005 | Narimatsu et al. | |
| 6,906,867 B2 | 6/2005 | Nagata | |
| 6,989,939 B2 | 1/2006 | Yamasaki et al. | |
| 7,038,857 B1 | 5/2006 | Kuo | |
| 7,489,449 B2 * | 2/2009 | Kawana | 359/680 |
| 8,077,397 B2 * | 12/2011 | Inoko | 359/682 |
| 2009/0135497 A1 * | 5/2009 | Nagahara et al. | 359/682 |

FOREIGN PATENT DOCUMENTS

| | | |
|---|---|---|
| TW | 556000 | 10/2003 |
| TW | 579433 | 3/2004 |
| TW | M281178 | 11/2005 |
| TW | M281179 | 11/2005 |
| TW | I257009 | 6/2006 |

* cited by examiner

*Primary Examiner* — Jordan Schwartz
(74) *Attorney, Agent, or Firm* — J.C. Patents

(57) ABSTRACT

A zoom lens includes a first lens group, a second lens group, a third lens group, and a fourth lens group. The first lens group including three lenses is disposed between a magnified side and an reduced side, and the first lens group has a negative refractive power. The second lens group including two lenses is disposed between the first lens group and the reduced side, and the second lens group has a positive refractive power. The third lens group including one lens is disposed between the second lens group and the reduced side, and the third lens group has a positive refractive power. The fourth lens group including seven lenses is disposed between the third lens group and the reduced side, and the fourth lens group has a positive refractive power.

15 Claims, 6 Drawing Sheets

ZOOM LENS

BACKGROUND OF THE INVENTION

1. Field of the Invention

The invention generally relates to a lens, and more particularly, to a zoom lens.

2. Description of Related Art

In order to design a projection lens with a high resolution, a low image distortion, a moderate wide angle, and a true zoom (the projection lens does not need to focus again after being switched from a wide-end to a tele-end or from a tele-end to a wide-end), more than four lens groups, several aspheric lenses or many lens combinations are required in an optical structure in the conventional art.

U.S. Pat. No. 6,738,196 discloses a zoom lens using thirteen spheric lenses and two aspheric lenses to reduce the total number of lenses of the zoom lens. U.S. Pat. No. 7,038,857 discloses a zoom lens having two lens groups. Besides, U.S. Pat. No. 6,906,867, U.S. Pat. No. 6,894,845, U.S. Pat. No. 6,989,939, and U.S. Pat. No. 6,137,638 disclose zoom lenses using more than four lens groups so as to reduce the total number of lenses of the zoom lens and prevent from using aspheric lenses in the zoom lens, however, results in a high manufacturing cost.

Furthermore, Taiwan Patent No. 556000 discloses a projection lens having five lens groups, the five lens groups move along an optical axis for zooming and focusing. Taiwan Patent No. 579433 and Taiwan Patent No. 257009 respectively provide a projection lens having four lens groups and a projection lens having three lens groups. Moreover, Taiwan Patent No. 281178 and Taiwan Patent No. 281179 respectively disclose zoom lenses having two lens groups and a compound lens.

SUMMARY OF THE INVENTION

The invention provides a zoom lens having a high resolution, a small image aberration, and a great magnifying power.

In order to achieve one or a part of or all of the above advantages or other advantages, an embodiment of the invention provides a zoom lens. The zoom lens includes a first lens group, a second lens group, a third lens group, and a fourth lens group. The first lens group is disposed between a magnified side and a reduced side and has a negative refractive power. The first lens group includes a first lens, a second lens, and a third lens arranged in sequence from the magnified side to the reduced side, wherein refractive powers of the first lens, the second lens, and the third lens are respectively positive, negative, and negative. The second lens group is disposed between the first lens group and the reduced side and has a positive refractive power. The second lens group includes a fourth lens and a fifth lens arranged in sequence from the magnified side to the reduced side, wherein refractive powers of the fourth lens and the fifth lens are respectively negative and positive. The third lens group is disposed between the second lens group and the reduced side and has a positive refractive power. The third lens group includes a sixth lens, wherein a refractive power of the sixth lens is positive. The fourth lens group is disposed between the third lens group and the reduced side and has a positive refractive power. The fourth lens group includes a seventh lens, an eighth lens, a ninth lens, a tenth lens, an eleventh lens, a twelfth lens, and a thirteenth lens arranged in sequence from the magnified side to the reduced side, wherein refractive powers of the seventh lens, the eighth lens, the ninth lens, the tenth lens, the eleventh lens, the twelfth lens, and the thirteenth lens are respectively positive, negative, negative, positive, negative, positive, and positive.

In view of the above, in the zoom lens of the embodiment of the invention, four lens groups are adopted, and the refractive powers of the first through thirteenth lenses are respectively positive, negative, negative, negative, positive, positive, positive, negative, negative, positive, negative, positive, and positive, such that the aberration of the image is effectively reduced, and the image with high resolution is achieved.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
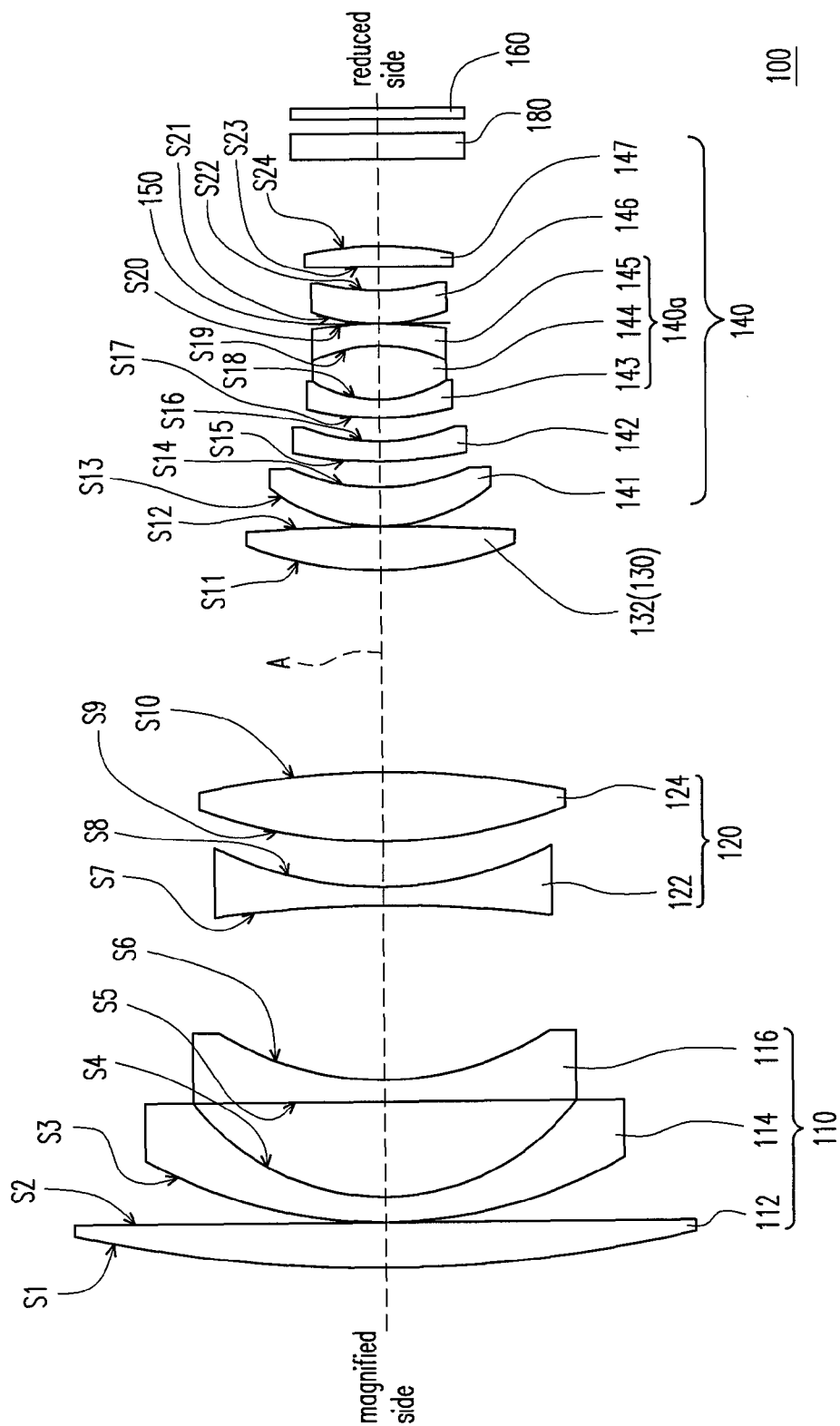
FIG. 1 is a schematic view illustrating the structure of a zoom lens at a wide-end of the zoom lens according to an embodiment of the invention.

FIG. 1 is a schematic view illustrating the structure of a zoom lens at a wide-end according to an embodiment of the invention. Referring to FIG. 1, the zoom lens 100 of the embodiment includes a first lens group 110, a second lens group 120, a third lens group 130, and a fourth lens group 140. The first lens group 110 is disposed between a magnified side and a reduced side, and the first lens group 110 has a negative refractive power. As shown in FIG. 1, the first lens group 110 includes a first lens 112, a second lens 114, and a third lens 116 arranged in sequence from the magnified side to the reduced side. Besides, refractive powers of the first lens 112, the second lens 114, and the third lens 116 are respectively positive, negative, and negative. In the embodiment, the first lens 112 is, for example, a plane-convex lens with a convex surface S1 facing the magnified side. The second lens 114 may be a convex-concave lens with a concave surface S4 facing the reduced side. The third lens 116 is, for example, a biconcave lens.

The second lens group 120 is disposed between the first lens group 110 and the reduced side and has a positive refractive power. The second lens group 120 includes a fourth lens 122 and a fifth lens 124 arranged in sequence from the magnified side to the reduced side, wherein refractive powers of the fourth lens 122 and the fifth lens 124 are respectively negative and positive. Specifically, the fourth lens 122 is, for example, a biconcave lens, and the fifth lens 124 is, for example, a biconvex lens.

The third lens group 130 disposed between the second lens group 120 and the reduced side and has a positive refractive power. Referring to FIG. 1, the third lens group 130 includes a sixth lens 132, wherein a refractive power of the sixth lens 132 is positive. The sixth lens 132 of the embodiment is, for example, a biconvex lens.

The fourth lens group 140 is disposed between the third lens group 130 and the reduced side and has a positive refractive power. The fourth lens group 140 includes a seventh lens 141, an eighth lens 142, a ninth lens 143, a tenth lens 144, an eleventh lens 145, a twelfth lens 146, and a thirteenth lens 147 arranged in sequence from the magnified side to the reduced side. Refractive powers of the seventh lens 141, the eighth lens 142, the ninth lens 143, the tenth lens 144, the eleventh lens 145, the twelfth lens 146, and the thirteenth lens 147 are respectively positive, negative, negative, positive, negative, positive, and positive. Specifically, the seventh lens 141 is, for example, a concave-convex lens with a convex surface S13 facing the magnified side. The eighth lens 142 is a convex-concave lens with a concave surface S16 facing the reduced side. The ninth lens 143 is a convex-concave lens with a concave surface S18 facing the reduced side. The tenth lens 144 is a biconvex lens, and the eleventh lens 145 is a convex-concave lens with a convex surface S20 facing the reduced side. In the embodiment, the ninth lens 143, the tenth lens 144, and the eleventh lens 145 together form a triple cemented lens 140a. The twelfth lens 146 is a concave-convex lens with a convex surface S21 facing the magnified side. The thirteenth lens 147 is a plane-convex lens with a convex surface S24 facing the reduced side.

In the embodiment, each of the first lens 112, the second lens 114, the third lens 116, the fourth lens 122, the fifth lens 124, the sixth lens 132, the seventh lens 141, the eighth lens 142, the ninth lens 143, the tenth lens 144, the eleventh lens 145, the twelfth lens 146, and the thirteenth lens 147 is a spherical lens, such that the manufacturing cost of the zoom lens 100 is significantly reduced. Besides, as shown in FIG. 1, the zoom lens 100 of the embodiment further includes an aperture stop 150 which is disposed between the eleventh lens 145 and the twelfth lens 146.

The zoom lens 100 of the embodiment is capable of imaging an object at the reduced side to the magnified side. Specifically, an image processing device 160, e.g. liquid crystal on silicon (LCOS), digital micro-mirror device, or another suitable light valve, is disposed at the reduced side, and a screen (not shown) may be disposed at the magnified side. The zoom lens 100 is capable of projecting an image frame formed by the image processing device 160 onto the screen. In this embodiment, the zoom lens 100 may be used in a front projection system. Moreover, a cover glass 180 may be further disposed between the thirteenth lens 147 and the image processing device 160 so as to protect the image processing device 160.

Figure 2:
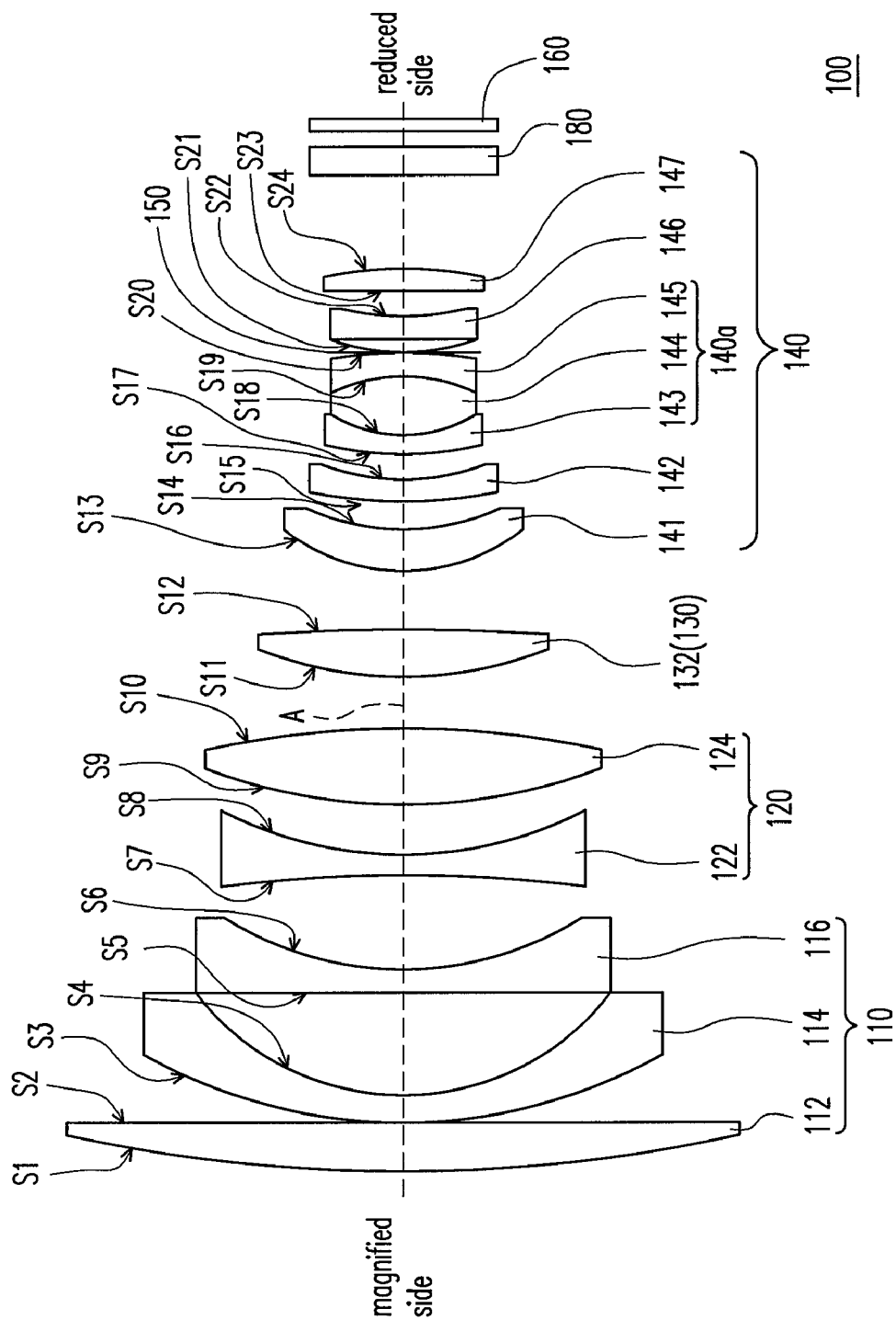
FIG. 2 is a schematic view illustrating the structure of the zoom lens of FIG. 1 when at a tele-end.

FIG. 2 is a schematic view illustrating the structure of the zoom lens of FIG. 1 when at a tele-end. Referring to both FIGS. 1 and 2, the first lens group 110 and the second lens group 120 are capable of moving toward the reduced side and simultaneously the third lens group 130 and the fourth lens group 140 are capable of moving toward the magnified side for zooming toward a tele-end of the zoom lens 100, so that the zoom lens 100 may project a smaller image frame. On the contrary, the first lens group 110 and the second lens group 120 are capable of moving toward the magnified side and simultaneously the third lens group 130 and the fourth lens group 140 are capable of moving toward the reduced side for zooming toward a wide-end of the zoom lens 100 as shown in FIG. 1, so that the zoom lens 100 may project a larger image frame. In this embodiment, the first lens group 110 is capable of moving with respect to the second lens group 120 for focusing. Moreover, in the embodiment, the zooming toward the tele-end and the wide-end is a true zoom. Specifically, after the zoom lens 100 has finished focusing, there is no need to focus again after the zoom lens 100 zooms, for example, changing from a wide-end to a tele-end or changing from a tele-end to a wide-end. In other words, as long as the distance between the screen (not shown) at the magnified side and the image processing device 160 at the reduced side is determined, the zoom lens 100 only requires focusing once. Even if the zoom lens 100 zooms after the focusing, the image is still clear. In one embodiment, the zoom lens 100 satisfies the condition $0.249<D/L<0.728$ when the zoom lens 100 is at the wide-end, where D is a diameter of an exit pupil of the zoom lens 100 and L is a distance between the exit pupil and an image surface located at the reduced side. Moreover, the zoom lens 100 satisfies the condition $0.249<D/L<0.728$ so as to achieve a shorter total length of the zoom lens 100 and good optical imaging quality.

From the above, the zoom lens 100 of the embodiment uses thirteen lenses without any aspherical lenses, such that not only the aberration of the image is diminished but also the manufacturing cost is reduced. Besides, a high zoom ratio of the zoom lens 100 is also achieved, for example, a zoom ratio of 1.5.

An embodiment of the zoom lens 100 is given hereinafter, wherein the parameters of zoom lens 100 is shown in the following Tables 1 and 2. However, the invention is not limited to the data listed in Table 1 and Table 2. It is known to those having ordinary skill in the art after referring to the invention that various modifications and variations may be made to the structure of the invention without departing from the scope or spirit of the invention.

TABLE 1

| Surface | Curvature Radius (mm) | Distance (mm) | Index of Refraction | Abbe Number | Notes |
|---|---|---|---|---|---|
| S1 | 166.18 | 5.22 | 1.73 | 54.7 | first lens |
| S2 | infinite | 0.15 | | | |
| S3 | 52.76 | 2.66 | 1.49 | 70.2 | second lens |
| S4 | 25.73 | 10.53 | | | |
| S5 | −444.49 | 1.93 | 1.85 | 23.8 | third lens |
| S6 | 33.82 | D1 | | | |
| S7 | −154.43 | 2.42 | 1.49 | 70.2 | fourth lens |
| S8 | 40.62 | 4.81 | | | |
| S9 | 56.04 | 7.51 | 1.81 | 25.4 | fifth lens |
| S10 | −86.23 | D2 | | | |
| S11 | 45.04 | 4.32 | 1.71 | 53.9 | sixth lens |
| S12 | −291.19 | D3 | | | |
| S13 | 19.68 | 4.15 | 1.77 | 49.6 | seventh lens |
| S14 | 24.23 | 3.41 | | | |
| S15 | 164.61 | 1.61 | 1.72 | 29.5 | eighth lens |
| S16 | 23.25 | 2.47 | | | |
| S17 | 37.68 | 1.67 | 1.85 | 23.8 | ninth lens |
| S18 | 14.88 | 5.7 | 1.5 | 81.5 | tenth lens |
| S19 | −19.28 | 2.68 | 1.72 | 29.5 | eleventh lens |
| S20 | −45.35 | 0.48 | | | |
| S21 | 29.47 | 3.33 | 1.77 | 49.6 | twelfth lens |
| S22 | 29.91 | 2.36 | | | |
| S23 | infinite | 2.3 | 1.85 | 23.8 | thirteenth lens |
| S24 | −44.77 | D4 | | | |

In Table 1, the distance refers to a linear distance along an optical axis A between two neighboring surfaces. For example, the distance of the surface S1 is the linear distance along the optical axis A between the surface S1 and the surface S2. The corresponding thickness, refractive index, and Abbe number of each lens in the Notes column refer to the numeral value of each distance, refractive index, and Abbe number in the same row. Moreover, in Table 1, the surfaces S1 and S2 are respectively two surfaces of the first lens 112, the surfaces S3 and S4 are two surfaces of the second lens 114, and the surfaces S5 and S6 are two surfaces of the third lens 116. The surfaces S7 and S8 are two surfaces of the fourth lens 122, and the surfaces S9 and S10 are two surface of the fifth lens 124. The surfaces S11 and S12 are two surfaces of the sixth lens 132. The surfaces S13 and S14 are two surfaces of the seventh lens 141, and the surfaces S15 and S16 are two surfaces of the eighth lens 142. The surfaces S17 and S18 are two surfaces of the ninth lens 143, the surfaces S18 and S19 are two surfaces of the tenth lens 144, and the surfaces S19 and S20 are two surfaces of the eleventh lens 145. The surfaces S21 and S22 are two surfaces of the twelfth lens 146, and the surfaces S23 and S24 are two surfaces of thirteenth lens 147, wherein the distance listed in the row of the surface S24 is the distance from surface S24 to the cover glass 180. Besides, D1, D2, D3, and D4 of Table 1 are variables so as to achieve the zooming function of the zoom lens 100. Values of D1, D2, D3, and D4 corresponding to the wide-end and the tele-end are respectively listed in Table 2.

TABLE 2

| Distance | Wide-end (mm) | Tele-end (mm) |
|---|---|---|
| D1 | 18.59 | 8.64 |
| D2 | 21.81 | 3.67 |
| D3 | 0.16 | 6.31 |
| D4 | 26 | 32.05 |

In Table 2, the distance D1 between the surfaces S6 and S7 is 18.59 mm when the zoom lens 100 is at the wide-end, and the distance D1 between the surfaces S6 and S7 is 8.64 mm when the zoom lens 100 is at the tele-end. The distance D2 between the surfaces S10 and S11 is 21.81 mm when the zoom lens 100 is at the wide-end, and the distance D2 between the surfaces S10 and S11 is 3.67 mm when the zoom lens 100 is at the tele-end. The distance D3 between the surfaces S12 and S13 is 0.16 mm when the zoom lens 100 is at the wide-end, and the distance D3 between the surfaces S12 and S13 is 6.31 mm when the zoom lens 100 is at the tele-end. The distance D4 between the surface S24 and the cover glass 180 is 26 mm when the zoom lens 100 is at the wide-end, and the distance D4 between the surface S24 and the cover glass 180 is 32.05 mm when the zoom lens 100 is at the tele-end.

In this embodiment, the effective focal length (EFL) of the zoom lens 100 is 20.62-30.92 millimeters, the numerical aperture (F/#) of the zoom lens 100 is 2.4-2.8, and the view angle (2ω) of the zoom lens 100 is 48.18°-69.02°.

Figure 3A:
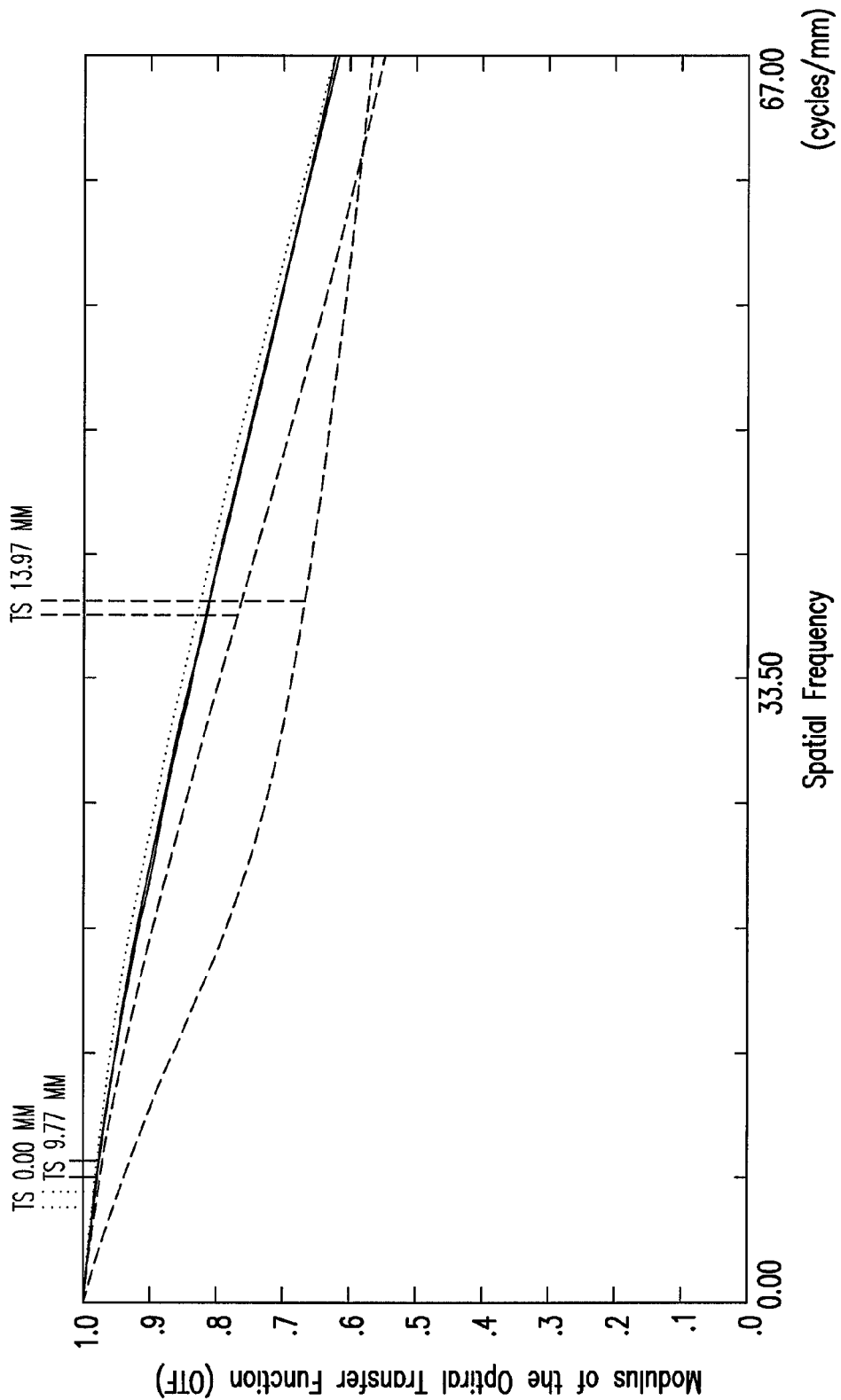
FIG. 3A is a modulation transfer function (MTF) graph of the zoom lens according to the embodiment of the invention.
Figure 3B:
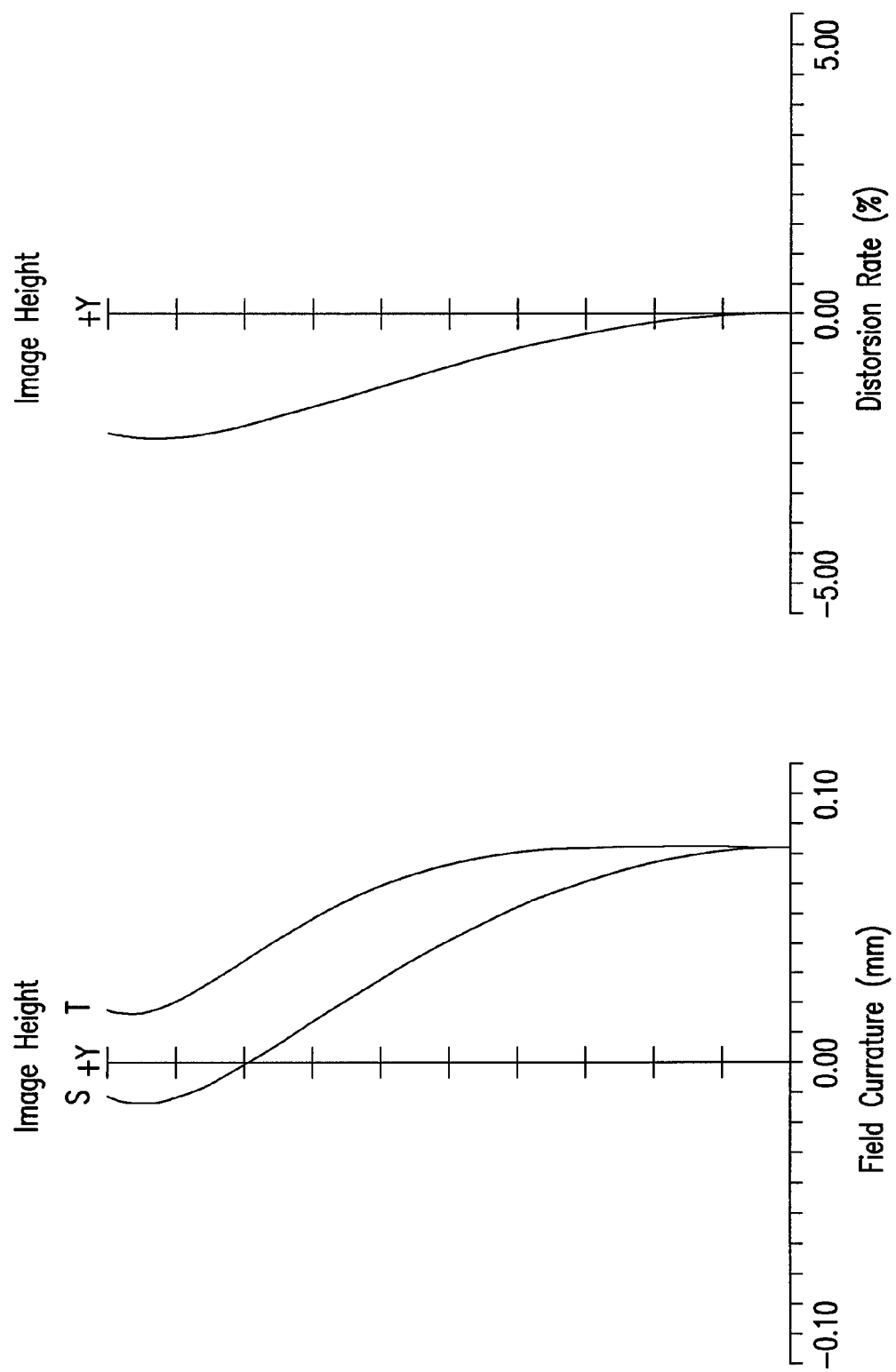
FIG. 3B shows graphics of a field curvature and a distortion of the zoom lens respectively at the left and the right according to the embodiment of the invention.
Figure 3C:
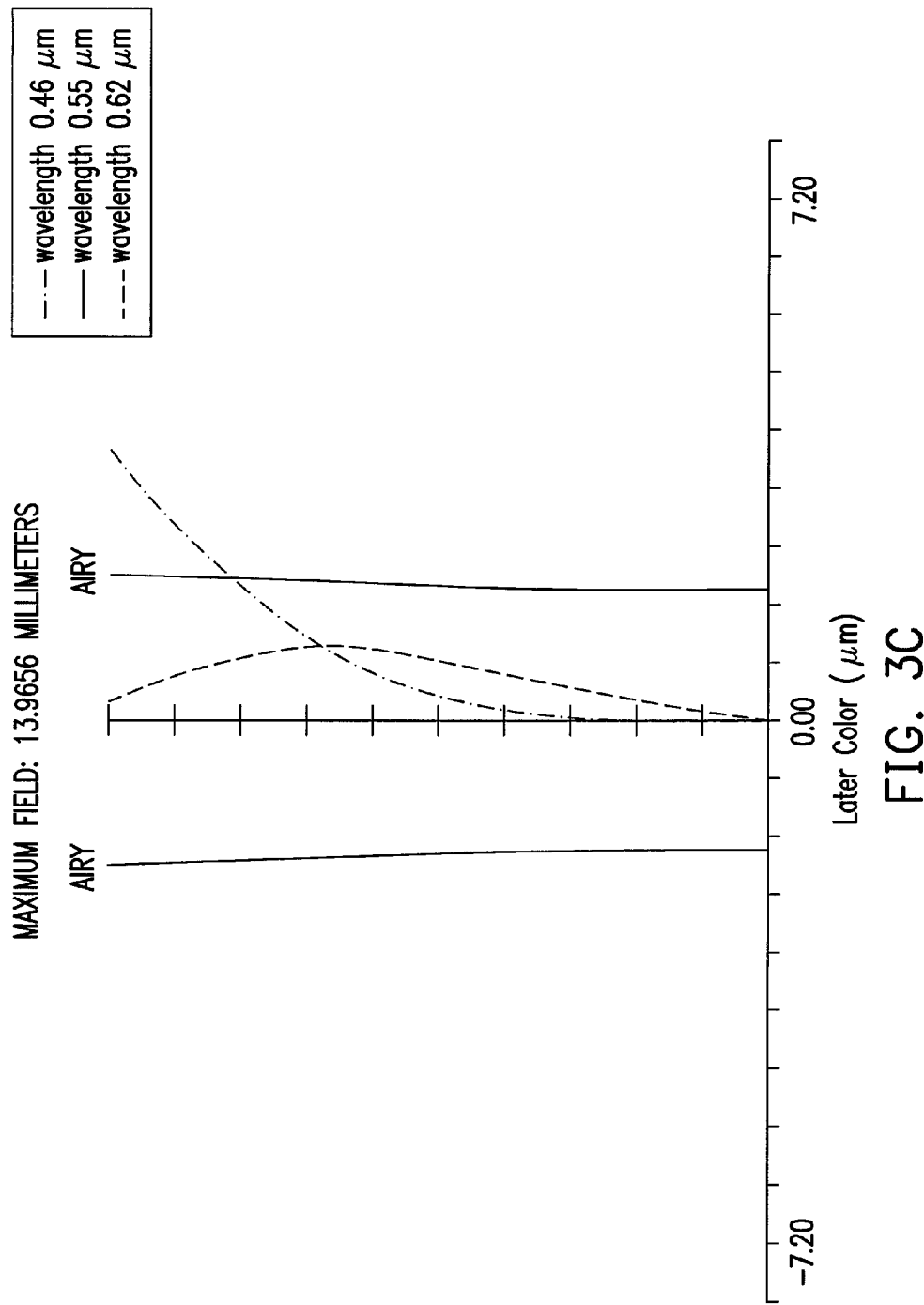
FIG. 3C shows a lateral color graph of the zoom lens according to the embodiment of the invention.
Figure 3D:
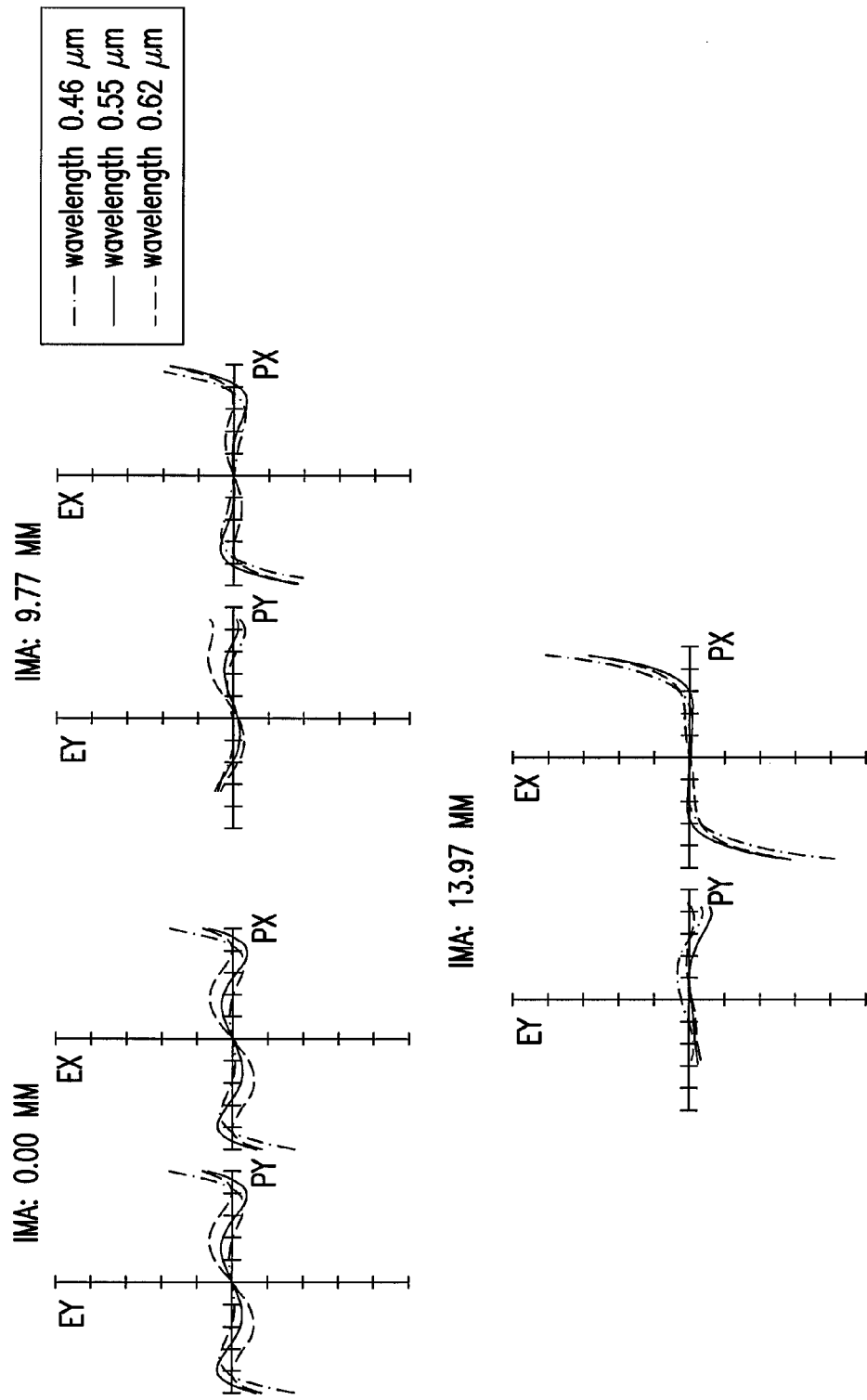
FIG. 3D is a transverse ray fan plot of the zoom lens according to the embodiment of the invention.

Referring to FIGS. 3A to 3D, FIG. 3A is a modulation transfer function (MTF) graph, and in the MTF graph, the transverse axis indicates a spatial frequency in cycles per millimeter, and the longitudinal axis indicates a modulus of the optical transfer function (OTF). FIG. 3B shows graphics of a field curvature and a distortion respectively at the left and the right, and in FIG. 3B, the longitudinal axes each indicate an image height and the transverse axes of the left one and the right one are respectively indicate a field curvature and a distortion rate. Moreover, FIG. 3C shows a lateral color graph of the zoom lens 100 and is simulated with light having wavelength of 460 nm, light having wavelength of 550 nm, and light having wavelength of 620 nm. FIG. 3D is a transverse ray fan plot of the zoom lens 100 and is simulated with light having wavelength of 460 nm, light having wavelength of 550 nm, and light having wavelength of 620 nm. The transverse axes each indicate the normalized entrance pupil coordinate, either PX or PY, and the longitudinal axes range from −50 microns to +50 microns. Since the graphics shown in all FIGS. 3A to 3D fall within a standard range, the zoom lens 100 of the embodiment maintains a good imaging quality with a high magnifying power and resolution, and a low distortion degree. Furthermore, because each of the lenses of the zoom lens 100 is a spherical lens, the manufacturing cost is also reduced.

In summary, the embodiment or the embodiments of the invention may have at least one of the following advantages. The zoom lens in the embodiments of the invention uses four lens groups having the first through thirteenth lenses respectively with the refractive powers of positive, negative, negative, negative, positive, positive, positive, negative, negative, positive, negative, positive, and positive, such that image aberration is eliminated and a high resolution is achieved. Moreover, the lens groups of the zoom lens are able to be adjusted for zooming toward a wide-end or toward a tele-end of the lens zoom. Besides, the zoom lens may adopt spherical lenses but may adopt no aspheric lens, so that the cost of the zoom lens is reduced while remaining the image quality.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A zoom lens, comprising:
    a first lens group disposed between a magnified side and a reduced side and having a negative refractive power, the first lens group comprising a first lens, a second lens, and a third lens arranged in sequence from the magnified side to the reduced side, wherein refractive powers of the first lens, the second lens, and the third lens are respectively positive, negative, and negative;
    a second lens group disposed between the first lens group and the reduced side and having a positive refractive power, the second lens group comprising a fourth lens and a fifth lens arranged in sequence from the magnified side to the reduced side, wherein refractive powers of the fourth lens and the fifth lens are respectively negative and positive;
    a third lens group disposed between the second lens group and the reduced side and having a positive refractive power, the third lens group comprising a sixth lens, wherein a refractive power of the sixth lens is positive; and
    a fourth lens group disposed between the third lens group and the reduced side and having a positive refractive power, the fourth lens group comprising a seventh lens, an eighth lens, a ninth lens, a tenth lens, an eleventh lens, a twelfth lens, and a thirteenth lens arranged in sequence from the magnified side to the reduced side, wherein refractive powers of the seventh lens, the eighth lens, the ninth lens, the tenth lens, the eleventh lens, the twelfth lens, and the thirteenth lens are respectively positive, negative, negative, positive, negative, positive, and positive.

2. The zoom lens as claimed in claim 1, further comprising an aperture stop disposed between the eleventh lens and the twelfth lens.

3. The zoom lens as claimed in claim 1, wherein the first lens is a plane-convex lens with a convex surface facing the magnified side, the second lens is a convex-concave lens with a concave surface facing the reduced side, and the third lens is a biconcave lens.

4. The zoom lens as claimed in claim 1, wherein the fourth lens is a biconcave lens, and the fifth lens is a biconvex lens.

5. The zoom lens as claimed in claim 1, wherein the sixth lens is a biconvex lens.

6. The zoom lens as claimed in claim 1, wherein the seventh lens is a concave-convex lens with a convex surface facing the magnified side, and the eighth lens is a convex-concave lens with a concave surface facing the reduced side.

7. The zoom lens as claimed in claim 1, wherein the ninth lens is a convex-concave lens with a concave surface facing the reduced side, the tenth lens is a biconvex lens, and the eleventh lens is a convex-concave lens with a convex surface facing the reduced side.

8. The zoom lens as claimed in claim 1, wherein the ninth lens, the tenth lens, and the eleventh lens together form a triple cemented lens.

9. The zoom lens as claimed in claim 1, wherein the twelfth lens is a concave-convex lens with a convex surface facing the magnified side, and the thirteenth lens is a plane-convex lens with a convex surface facing the reduced side.

10. The zoom lens as claimed in claim 1, wherein the first lens group and the second lens group are capable of moving toward the magnified side and simultaneously the third lens group and the fourth lens group are capable of moving toward the reduced side for zooming toward a wide-end of the zoom lens.

11. The zoom lens as claimed in claim 1, wherein the first lens group and the second lens group are capable of moving toward the reduced side and simultaneously the third lens group and the fourth lens group are capable of moving toward the magnified side for zooming toward a tele-end of the zoom lens.

12. The zoom lens as claimed in claim 11, wherein the zooming toward a tele-end and a wide-end is a true zoom.

13. The zoom lens as claimed in claim 1, wherein the first lens group is capable of moving with respect to the second lens group for focusing.

14. The zoom lens as claimed in claim 1, wherein each of the first lens, the second lens, the third lens, the fourth lens, the fifth lens, the sixth lens, the seventh lens, the eighth lens, the ninth lens, the tenth lens, the eleventh lens, the twelfth lens, and the thirteenth lens is a spherical lens.

15. The zoom lens as claimed in claim 1, wherein a diameter of an exit pupil of the zoom lens is D, a distance between the exit pupil and an image surface located at the reduced side is L when the zoom lens is at a wide-end, and $0.249 < D/L < 0.728$.

* * * * *